(12) United States Patent
Ryder

(10) Patent No.: US 12,054,396 B2
(45) Date of Patent: Aug. 6, 2024

(54) APPARATUS AND METHOD FOR DECOLORIZING DIAMONDS

(71) Applicant: John Ryder, Orlando, FL (US)

(72) Inventor: John Ryder, Orlando, FL (US)

(*) Notice: Subject to any disclaimer, the term of this patent is extended or adjusted under 35 U.S.C. 154(b) by 562 days.

(21) Appl. No.: 17/336,652

(22) Filed: Jun. 2, 2021

(65) Prior Publication Data
US 2022/0017372 A1    Jan. 20, 2022

Related U.S. Application Data

(60) Provisional application No. 63/051,504, filed on Jul. 14, 2020.

(51) Int. Cl.
*C01B 32/28* (2017.01)

(52) U.S. Cl.
CPC .......... *C01B 32/28* (2017.08); *C01P 2006/60* (2013.01)

(58) Field of Classification Search
None
See application file for complete search history.

(56) References Cited

U.S. PATENT DOCUMENTS

| | | | | |
|---|---|---|---|---|
| 6,083,354 A | * | 7/2000 | Deguchi | C01B 32/28 427/523 |
| 8,110,171 B1 | * | 2/2012 | Roy | C23C 16/27 438/689 |
| 8,435,597 B2 | | 5/2013 | Koide et al. | |
| 2002/0172638 A1 | | 11/2002 | Vagarali et al. | |
| 2008/0265179 A1 | * | 10/2008 | Havens | A61L 2/10 250/492.1 |
| 2009/0110626 A1 | | 4/2009 | Hemley et al. | |
| 2009/0291287 A1 | | 11/2009 | Twitchen et al. | |
| 2018/0207303 A1 | * | 7/2018 | Farren | A61L 2/10 |

FOREIGN PATENT DOCUMENTS

| | | | |
|---|---|---|---|
| JP | H0648716 A | * | 2/1994 |
| JP | H0687692 A | * | 3/1994 |

OTHER PUBLICATIONS

English translation of JPH0648716A Description (Year: 1994).*
English translation of Jp H0687692 A (Year: 1994).*
Braham, R. J. and Harris, A. T. Review of major design and scale-up considerations for solar photocatalytic reactors. Ind. Eng. Chem. Res. 2009, 48, 8890-8905. (Year: 2009).*

(Continued)

*Primary Examiner* — Anthony J Zimmer
*Assistant Examiner* — Zachary John Baum
(74) *Attorney, Agent, or Firm* — ALLEN, DYER ET AL.

(57) ABSTRACT

A method of decolorizing diamonds includes placing a diamond in an opaque container with a UV-C light source, and sealing the opaque container so that it is substantially airtight. The method also includes powering on the UV-C light source to expose the diamond to the UV-C light for a pre-determined amount of time for the exposure, powering off the UV-C light source, and venting the opaque container to release generated ozone. In addition, the method includes repeating powering on and off the UV-C light source until an improved color of the diamond is achieved.

17 Claims, 4 Drawing Sheets

(56) References Cited

OTHER PUBLICATIONS

Friis, S. D., et al. The development and application of two-chamber reactors and carbon monoxide precursors for safe carbonylation reactions. Acc. Chem. Res. 2016, 49, 594-605. (Year: 2016).*

Thor Labs. Stabilized deuterium UV light source, 2024. https://www.thorlabs.com/newgrouppage9.cfm?objectgroup_id=11783 (accessed on Feb. 16, 2024). (Year: 2024).*

World Health Organization. Radiation: ultraviolet (UV) radiation, 2016. https://www.who.int/news-room/questions-and-answers/item/radiation-ultraviolet-(uv) (accessed on Feb. 15, 2024). (Year: 2016).*

* cited by examiner

APPARATUS AND METHOD FOR DECOLORIZING DIAMONDS

RELATED APPLICATION

The present application claims the priority benefit of provisional application Ser. No. 63/051,504 filed on Jul. 14, 2020, the entire contents of which are herein incorporated by reference.

FIELD

The present invention relates to the field of gemology, and, more particularly, to an apparatus and method for decolorizing diamonds.

BACKGROUND

Diamonds are broadly classified into natural and synthetic diamonds, on the basis of their origin. A natural diamond is a diamond that is formed naturally in the earth by prolonged exposure of carbon-bearing materials to high pressure and temperature. Natural diamonds possess a color that ranges from clear and colorless to yellow, orange, red, pink, blue, green, brown, and even black. The cut, color, clarity and carat size, generally determine the price of a diamond. However, the price of the diamond largely depends on the carat size and color of the diamond. In natural diamonds, brown-colored diamonds are most common and relatively inexpensive.

Clear or colorless diamonds are highly priced, and are extensively used in making jewelry. Even the faintest tinge of yellow in colorless diamonds considerably reduces the price of the colorless diamonds. Therefore, diamonds are decolorized to increase their aesthetic appeal and economic value. Low priced brown-colored diamonds are decolorized to colorless to increase their economic value.

Diamonds are typically decolorized using a High Pressure High Temperature (HPHT) process. However, there are many drawbacks to using the HPHT process. Accordingly, there is a need in the art for a cost effective method to produce clear or colorless diamonds without damaging the diamonds.

SUMMARY

An apparatus and method for decolorizing diamonds is disclosed. The method includes placing a diamond in an opaque container with a UV-C light source, and sealing the opaque container so that it is airtight. The method also includes powering on the UV-C light source to expose the diamond to the UV-C light for a pre-determined amount of time for the exposure, powering off the UV-C light source, and venting the opaque container to release generated ozone. In addition, the method includes repeating powering on and off the UV-C light source until an improved color of the diamond is achieved.

In another particular aspect, an apparatus for decolorizing diamonds is disclosed. The apparatus includes a container, which is airtight when closed, and a shortwave UV-C light source. A fused quartz base is used for holding the diamond, typically with the table of the diamond facing up towards the UV-C light source. A power source may have a built in remotely activated timer and the power source is connected to the UV-C light. A remote may be used for turning the power source on and off, and the remote may be wired or wireless. In addition, an inner lining of the container includes UV-C reflective material such as aluminum, and a distance between the UV-C light source and the diamond is calculated to allow for a minimum of 54.82 watts/m2 UV-C light intensity.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

Figure 1:
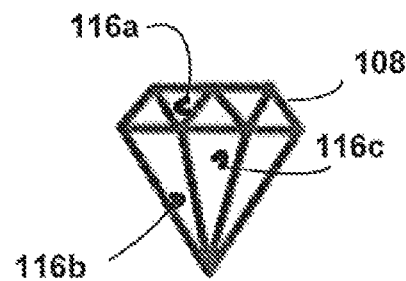
FIG. 1 is a schematic of a diamond having imperfections.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As explained above, diamonds used for ornamental purposes are of great value due to their physical properties, which confer optical characteristics considered beautiful such as color, scintillation pattern, fire, and brilliance. These features contribute significant value to natural diamonds, which has prompted considerable research into synthetic alternatives and treatment methods for increasing the market value of lower quality diamonds.

Diamonds are made up of carbon atoms arranged in a crystal lattice structure, with crystallographic defects being very common. These irregularities in the carbon lattice structure may be due to interstitial impurities or extrinsic substitutional impurities occurring during or after diamond growth. The defects alter the material properties of a diamond and are the basis of diamond classification type. Such defects prominently affect diamond color and electrical conductivity and are the root of undesirable optical properties such as a yellow color which results in a lower market value for a diamond.

The invention provides a low-cost method of reducing or eliminating the less desirable colors of commercial diamonds, with emphasis on the common yellow hue. This method offers the advantage of treating stones that are mounted in jewelry, which cannot be done with HPHT methods and does not confer the degree of brittleness that results from HPHT methods. Furthermore, other enhancement methods such as coating the diamond to artificially whiten its appearance become unnecessary after the diamond has been treated with the inventive apparatus and methods described herein. Additionally, this invention improves clarity through the bleaching of color in some inclusions, and eliminating the need for laser drilling of inclusions as an enhancement technique.

As explained in detail below, the method for decolorizing diamonds includes placing a diamond in an opaque container with a UV-C light source, and closing the container. The method also includes turning on the UV-C light source to expose the diamond to the UV-C light, powering the UV-C light source (e.g., a bulb or lamp) for a pre-determined amount of time for the exposure (e.g., approximately twenty minutes), turning off the UV-C light source, and opening the container to vent generated ozone. The diamond is inspected for color/inclusion changes. The process of exposing the diamond(s) to the UV-C light source is repeated until a desired effect (i.e., color) of the diamond is reached.

In a particular aspect, the wavelength of the UV-C light is in the range of shortwave UV-C, and in another particular aspect the wavelength is 253.7 nm. The method for decolorizing the diamond includes performing the method at room temperature, in a particular aspect, and standard atmospheric pressure.

A diamond 108 is shown in FIG. 1 that has undesirable visible defects 116a, 116b, 116c. The diamond 108 can be treated with the inventive apparatus and methods to reduce or virtually eliminate those defects.

Figure 2:
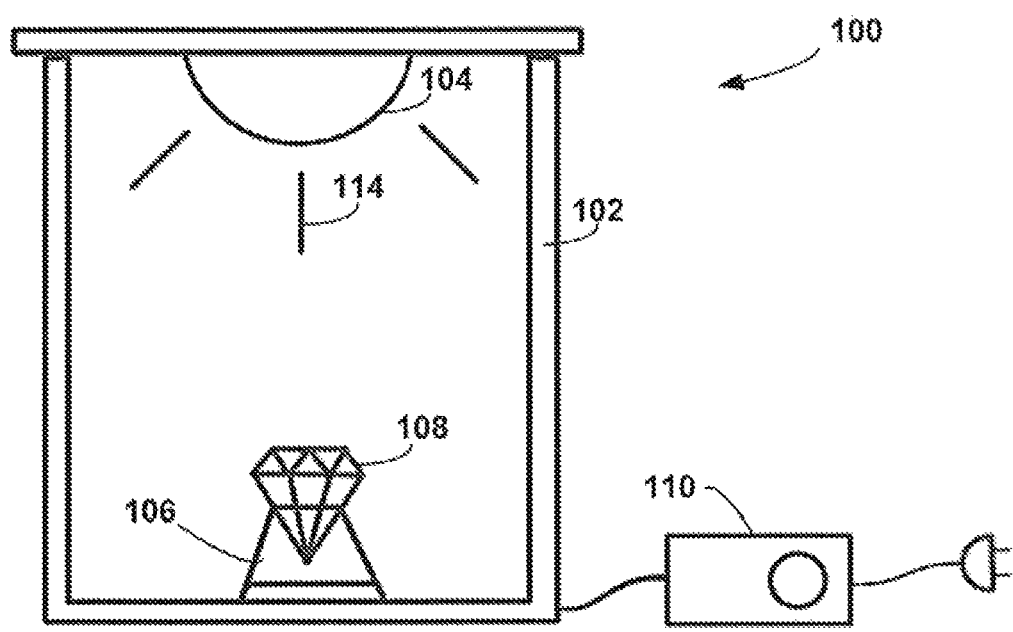
FIG. 2 is a schematic of an apparatus to treat the diamond of FIG. 1 in accordance with particular aspects of the invention disclosed herein.
Figure 3:
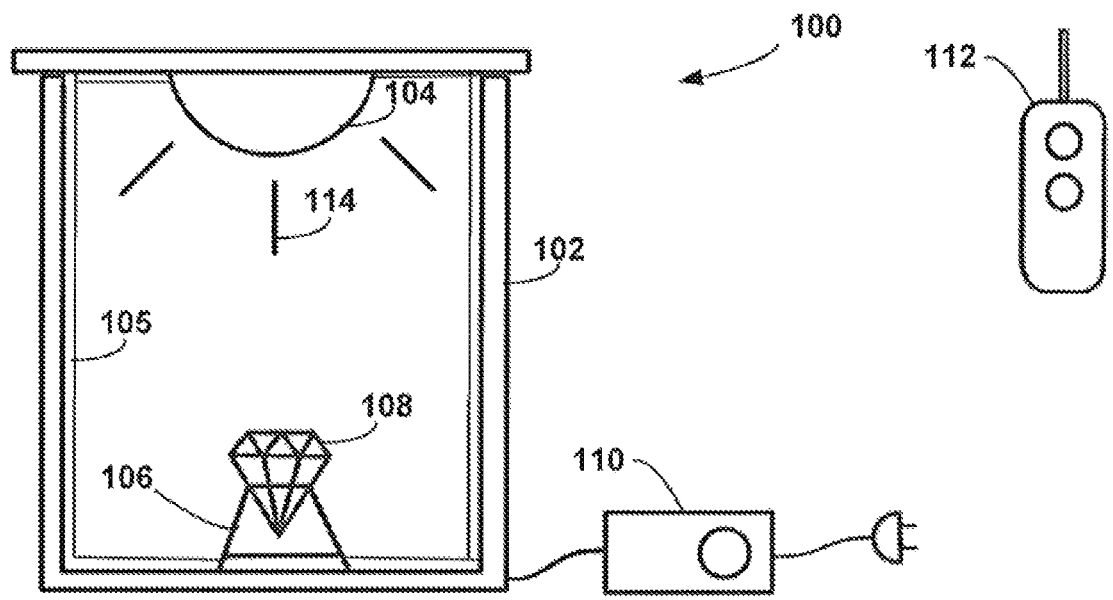
FIG. 3 is a schematic of the apparatus of FIG. 2 having an inner lining and remote control.
Figure 4:
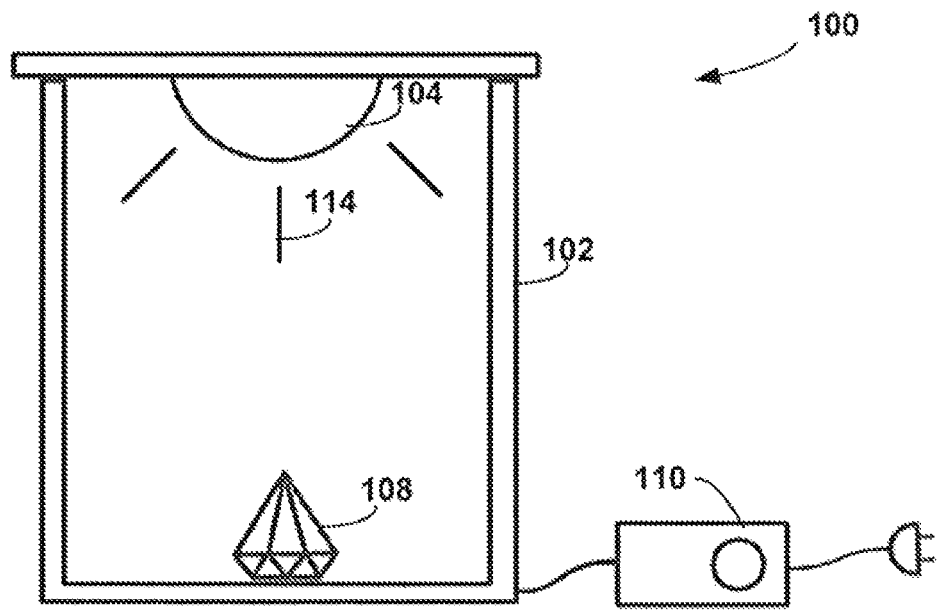
FIG. 4 is a schematic of the apparatus of FIG. 2 with the diamond orientated with its table facing down.

Referring now to FIGS. 2-3, an apparatus for the decolorizing and reducing the impurities of diamonds is illustrated and generally designated 100. The apparatus includes a container 102, which is substantially airtight when closed, and a shortwave UV-C light source 104 that provides light in the UV-C range 114. A fused quartz or Vycor® base 106 is used for holding the diamond 108, typically with the table of the diamond 108 facing up towards the UV-C light source 104. Those of ordinary skill in the art can appreciate that the table of the diamond 108 may be face down as shown in FIG. 4 and not resting on a base as shown in FIGS. 2 and 3.

The apparatus 100 includes a power source 110 that may be connected to a wall outlet or other similar device that provides an electric current. The power source 110 is configured to convert the electric current to the correct voltage, current and frequency for the UV-C light source 104. The power source 110 may also include a built in remotely activated timer. In addition, a remote 112 may be used for turning the power source 110 on and off, and the remote 112 may be wired or wireless as shown in FIG. 3.

The container 102 is substantially airtight in order to prevent the release of ozone that is produced when the apparatus is operating. In addition, an inner lining 105 may be included on the interior of the container 102 as shown in FIG. 3. The inner lining 105 of the container 102 may include UV-C light reflective material such as aluminum, for example. The distance between the UV-C light source 104 and a closest surface of the diamond 108 (i.e., the table) is calculated to allow for a minimum of 54.82 watts/m² UV-C light intensity in a particular aspect.

Figure 5:
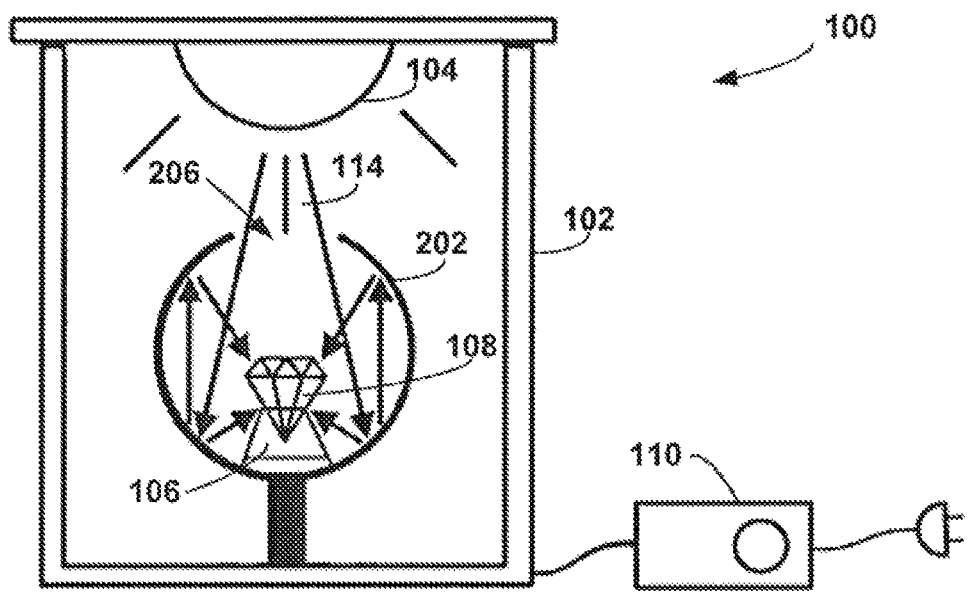
FIG. 5 is a schematic of the apparatus of FIG. 2 having a parabolic reflector.
Figure 6:
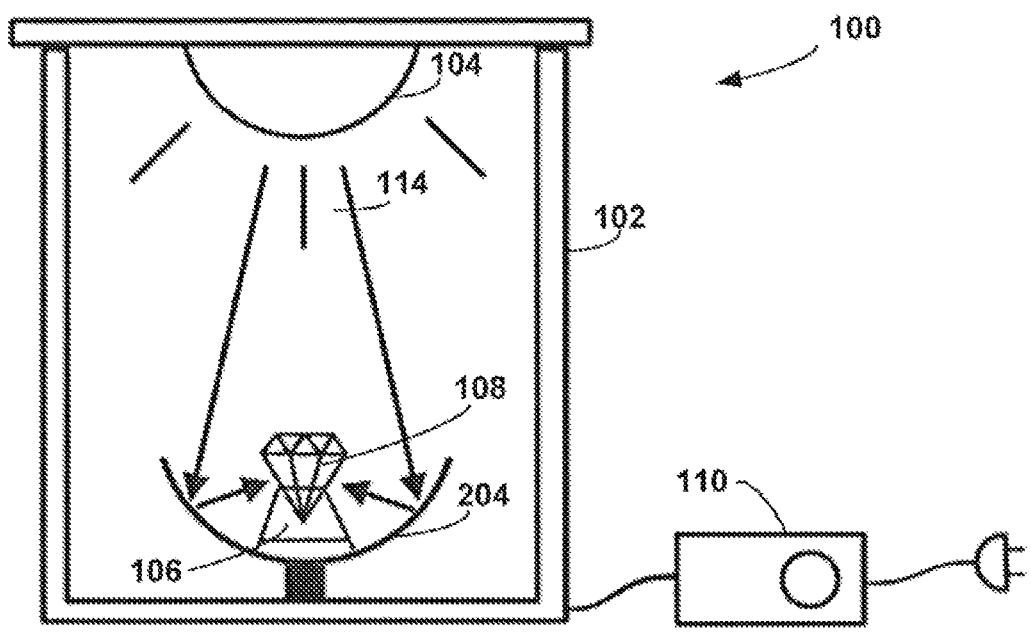
FIG. 6 is a schematic of the apparatus of FIG. 2 with the parabolic reflector of FIG. 4 having a larger aperture.

FIG. 5 is a schematic of the apparatus of FIG. 1 having a parabolic reflector 202. The parabolic reflector 202 is configured to direct the UV-C light 114 to more surfaces of the diamond 108 through an aperture 206. FIG. 6 is another aspect of a parabolic reflector 204 with the parabolic reflector of FIG. 4 having a larger aperture or otherwise being openly facing the light source 104. As those of ordinary skill in the art can appreciate, the aperture of the parabolic reflector 202, 204 can be configured for the desired results and the parabolic reflectors 202, 204 shown in FIGS. 5 and 6 are exemplary and not limiting configurations.

Figure 7:
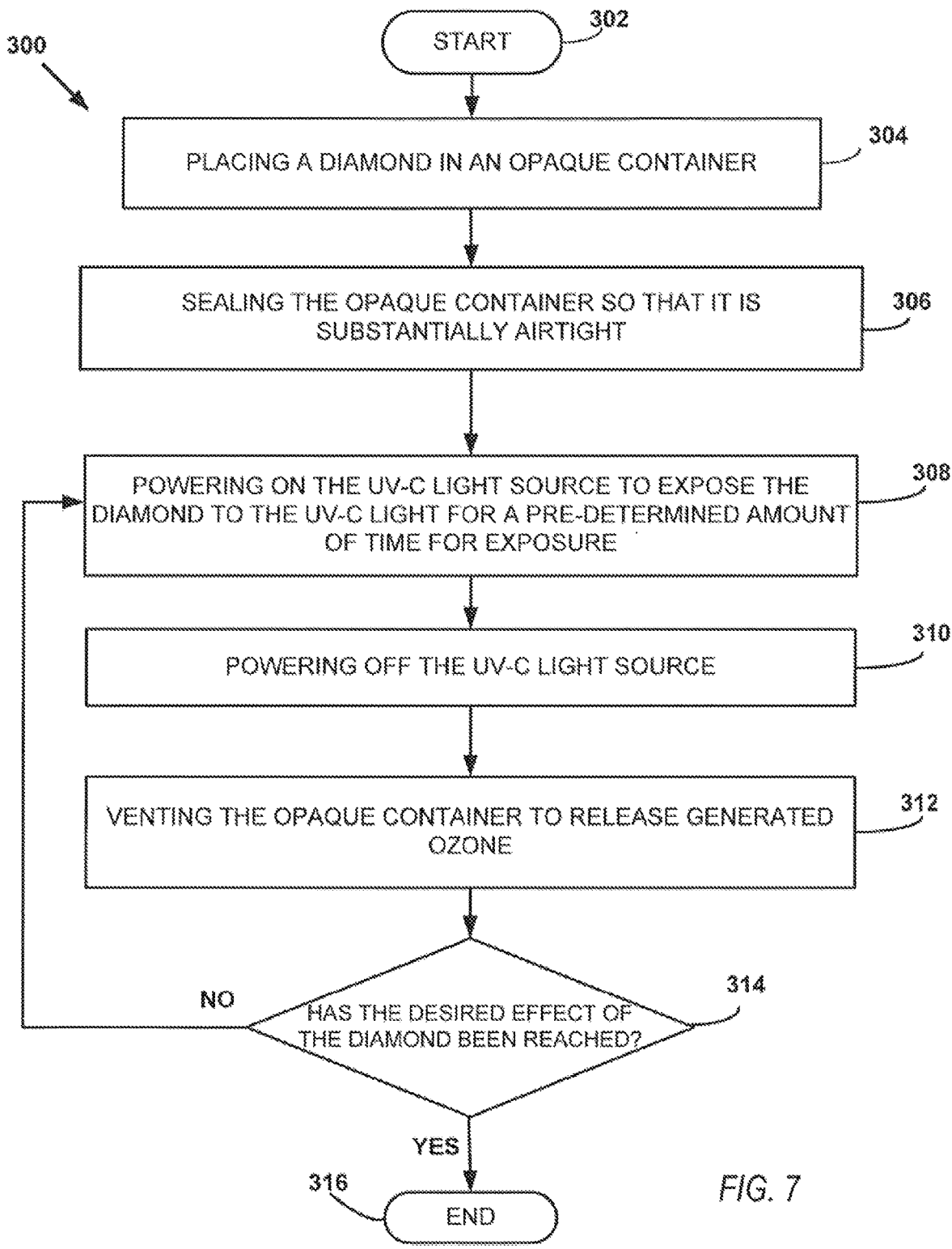
FIG. 7 is a flowchart of a method of decolorizing diamonds using the apparatus of FIG. 2.

Referring now to FIG. 7, a flow chart of a method of decolorizing diamonds 300 using an opaque container having a UV-C light source therein is disclosed. The method begins at 302 with a user placing a diamond in an opaque container, at 304. The method also includes, at 306, sealing the opaque container so that it is substantially airtight and powering on the UV-C light source to expose the diamond to the UV-C light for a pre-determined amount of time for exposure, at 308.

In addition, the method includes powering off the UV-C light source, at 310, and venting the opaque container to release generated ozone, at 312. The method includes determining whether the desired effect of the diamond been reached, at 314, and if it has, then the method ends at 316. Otherwise, the method repeats again, at 314, with powering on the UV-C light source to expose the diamond to the UV-C light for a pre-determined amount of time for exposure, at 308, until the desired effect of the diamond has been reached.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined herein.

That which is claimed is:

1. A method of decolorizing diamonds using an opaque container having a UV-C light source therein, the method comprising:
    placing a diamond in the opaque container;
    sealing the opaque container so that it is substantially airtight;
    powering on the UV-C light source to expose the diamond to the UV-C light for a pre-determined amount of time for the exposure;
    powering off the UV-C light source;
    venting the opaque container to release generated ozone; and
    repeating powering on and off the UV-C light source until an improved color of the diamond is achieved;
    wherein a pressure inside of the opaque container is approximately atmospheric pressure.

2. The method of claim 1, wherein a wavelength of the UV-C light is approximately 253.7 nm.

3. The method of claim 1, wherein the opaque container comprises a fused quartz base configured for holding the diamond.

4. The method of claim 1, wherein the powering on and off of the UV-C light source is controlled by a timer.

5. The method of claim 1, wherein the opaque container comprises an inner lining of reflective material.

6. The method of claim 1, wherein the diamond is positioned a distance away from the UV-C light source in order to receive a UV-C light intensity of approximately 54.82 watts/m2.

7. The method of claim 1, wherein a parabolic reflector is positioned around the diamond in order to direct the UV-C light to a plurality of surfaces of the diamond.

8. The method of claim 7, wherein the parabolic reflector comprises an aperture facing the UV-C light source.

9. The method of claim 1, wherein a table of the diamond is positioned to face towards the UV-C light source.

10. A method of decolorizing diamonds using an opaque container having a UV-C light source therein, the method comprising:
    placing a diamond in the opaque container;
    sealing the opaque container so that it is substantially airtight;
    powering on the UV-C light source to expose the diamond to the UV-C light for a pre-determined amount of time for the exposure;
    powering off the UV-C light source;
    venting the opaque container to release generated ozone; and
    repeating powering on and off the UV-C light source until an improved color of the diamond is achieved;
    wherein the diamond is positioned a distance away from the UV-C light source in order to receive a UV-C light intensity of approximately 54.82 watts/m2.

11. The method of claim 10, wherein a wavelength of the UV-C light is approximately 253.7 nm.

12. The method of claim 10, wherein a pressure inside of the opaque container is approximately atmospheric pressure.

13. The method of claim 10, wherein the opaque container comprises a fused quartz base configured for holding the diamond.

14. The method of claim 10, wherein the powering on and off of the UV-C light source is controlled by a timer.

15. The method of claim 10, wherein the opaque container comprises an inner lining of reflective material.

16. The method of claim 10, wherein a parabolic reflector is positioned around the diamond in order to direct the UV-C light to a plurality of surfaces of the diamond.

17. The method of claim 16, wherein the parabolic reflector comprises an aperture facing the UV-C light source.

* * * * *